United States Patent [19]

Brown

[11] Patent Number: 5,387,042

[45] Date of Patent: Feb. 7, 1995

[54] MULTILINGUAL KEYBOARD SYSTEM

[76] Inventor: Carl W. Brown, 3452 Shangri-La Rd., Lafayette, Calif. 94549

[21] Appl. No.: 71,697

[22] Filed: Jun. 4, 1993

[51] Int. Cl.⁶ .............................. B41J 5/00; B41J 5/10
[52] U.S. Cl. ...................................... 400/477; 400/484; 400/109; 400/490; 340/711; 345/171
[58] Field of Search ................. 364/419.17; 340/711; 345/168, 171, 172; 400/109, 111, 484, 485, 489, 490, 472, 477

[56] References Cited

U.S. PATENT DOCUMENTS

| | | | |
|---|---|---|---|
| 3,200,375 | 8/1965 | Lutz | 340/147 |
| 4,075,465 | 2/1978 | Funk et al. | 235/145 R |
| 4,124,843 | 11/1978 | Bramson et al. | 340/337 |
| 4,280,121 | 7/1981 | Crask | 340/365 VL |
| 4,326,193 | 4/1982 | Markley et al. | 340/365 R |
| 4,633,227 | 12/1986 | Menn | 340/365 VL |
| 5,089,690 | 2/1992 | Okamura | 235/145 R |
| 5,181,029 | 1/1993 | Kim | 241/20 |
| 5,189,608 | 2/1993 | Lyons et al. | 364/408 |

FOREIGN PATENT DOCUMENTS

2152437  8/1985  United Kingdom ................. 400/484

OTHER PUBLICATIONS

IBM Technical Disclosure Bulletin, 1981, vol. 23, pp. 4611–4613.
AS/400 Translational Language Support Planning Guide, IBM Corp.
MS-DOS User's Guide, Microsoft Corp., pp. 227–239.
Product Literature, Hooleon Corporation (3 Pages).
Product Literature, Key Source International (2 Pages).
Product Literature, Protolab (11 Pages).

*Primary Examiner*—Edgar S. Burr
*Assistant Examiner*—Lynn D. Hendrickson
*Attorney, Agent, or Firm*—Michael J. Hughes; Bradley T. Sako

[57] ABSTRACT

A multilingual keyboard system (10) including a customized keyboard unit (12) is provided to operate in conjunction with a central processing unit (14) and a logic system (16) having unique software in order to facilitate multilingual typing from a single keyboard. The keyboard (12) includes customized keys (20) which are shaped to receive label panels (70) on one of several selectable templates (18). Each template (18) corresponds to a particular character set which the user desires to utilize as an alternate character set to that appearing on the key labels (52) on the keyboard (12). The keyboard (12) also includes a keyboard mode toggle key (36) for toggling between a standard mode of operation and the selected alternate mode. The logic system (16) includes software having keymapping schemes associated with each selectable alternate mode. Changing templates (18) permits usage of multiple alternate modes with the same equipment.

9 Claims, 6 Drawing Sheets

MULTILINGUAL KEYBOARD SYSTEM

TECHNICAL FIELD

The present invention relates generally to data entry devices, and more particularly to keyboards used for data entry. The present invention is a keyboard system that is easily and rapidly adapted for multi-lingual applications.

BACKGROUND ART

Technology has led to a revolution in information and communications. By use of a globe encircling telecommunications networks, one can instantly cross borders and contact foreign family, friends, and business associates. While this revolution has made national borders an insignificant hurdle, cultural borders can be more demanding, particularly in the case of language. While various global industry standards have spread across the globe and have drawn people closer together, language, due to its deep historical, cultural, and even religious ties, will continue to separate people.

The universal flagship of this "information revolution" has been the computer, particularly the personal computer. While the personal computer has made an undeniable impact on the world, even today it is prevalent in only a small portion of the world. As is clear in the market of today, and inevitable in the market of the future, computers must have the ability to adapt to different cultures.

Many attempts have been made to the bridge the language barrier. Hooleon Corporation, among many others, has presented a variety of keyboards and accessories as solutions to the problem. Of these, the Bilingual Keyboards of Hooleon are standard keyboards in which the keytops of each key have both an English letter and a foreign character. These keyboards function well but are limiting. A different keyboard is required for each different pair of languages. This requires multi-lingual operators to purchase a number of keyboards and manually remove and install a different keyboard when switching between languages.

Other solutions which have been brought forth in the marketplace include keyfront labels, relegendable keys, and custom key imprinting. The keyfront labels are clear labels depicting alternate characters, designed to stick on the keytops of keys. When the labels are installed the user can see both the regularly occurring key identification as well as the alternate character of the label. This application also has drawbacks as there is limited room on the key top for displaying alternate characters. Therefore, a single keyboard will only have one, or at the most, two other alternate character sets. To serve more than three character sets will require an additional keyboard.

The same limitation occurs in the relegendable keys. The relegendable keys are keys with a snap-on transparent top. The user may write on the top or insert a label between the top and the key. For such an application the room on the key top is limited. Either more keyboards are necessary for servicing more than three languages, or the legends on the keyboard will be extremely small. In addition, the relegendable keys are more expensive to manufacture than other keys due to the transparent top and snap-on structure. This is especially true when dealing with languages with such extensive character sets that each key is required to produce three or more characters. Putting more than two legends on a key is impractical.

Custom keys are specially designed keys with additional characters imprinted on the keytops and key sides. This solution has the same drawback as the relegendable keys due to the limited area upon which alternate characters can be imprinted.

Alternate designs for achieving keyboards for multilingual applications are disclosed in *IBM Technical Disclosure Bulletin*, 1981 Vol. 23, p.9611. This bulletin sets forth techniques using Light Emitting Diodes (LED's) or a Liquid Crystal Display (LCD) on the key caps. Another design is shown in *IBM Technical Disclosure Bulletin*, 1981 Vol. 24, p.221. This bulletin demonstrates displaying projected character images on blank keys. While both of these designs are effective solutions to overcoming language barriers, they are expensive due to the additional hardware and design requirements.

Another type of design involves utilizing an overlay on top of the keyboard. The overlay is a structure which rests on the keyboard. One style is a thin membrane while another has a rigid skeleton with flexible plastic domes into which the keys from the keyboard extend. Overlaps allow alternate characters to be printed on the flexible portions corresponding to the keys, thus reassigning the keys if associated software is provided. Overlaps have drawbacks, however. First, overlay material can dramatically change the touch and feel of the keys. Second, in order to accommodate the overlaps, the keys are often circular, or spaced further apart than those of a standard personal computer keyboard.

U.S. Pat. No. 4,075,465 teaches a template overlay for providing additional key identifying information. While this design effectively provides alternate characters for each key it necessarily requires that the keys be either spaced further apart, or be of smaller size. This increase in distance and/or key size would force competent touch typists to relearn the keyboard as the user's fingers are forced to move further or be extremely precise in order to hit the smaller keys.

Many operating systems, including the most recent version (version 6.0) of the IBM PC compatible operating system MS-DOS produced by Microsoft Corporation, include international use applications. The DOS type application involves loading a memory resident program with the command "nlsfunc" which enables the user to switch between different country designations. In addition, the command "mode con cp prep" must be executed to load the alternate character set into memory, and the command "keyb" must be executed to assign alternate character sets to the keyboard. This system requires the user to have a picture of the alternate character layout on hand at all times. Unless one can touch-type in the alternate configuration this arrangement hampers performance as the user must continually refer to the keyboard picture to ensure they are striking the correct key.

A discussion of the prior art manners in which systems receive input from keyboards and keyboard-like structures is helpful in undertaking the type of problems involved in producing multilingual input devices. The material set forth below is intended to serve as background in understanding the operation, motivation and advantages of the present invention.

Generally, keyboards which are directly connected to modern computers produce digital scan codes. The scan code corresponds to the (combination of) key(s)

which have been pressed or released. The operating system in the computer then decodes these signals and converts them to characters, or controls. For example, on a typical American type DOS PC, assume that the user presses the <right shift> key (36H) then the <A> key (1Eh). This will produce an uppercase "A" since the <right shift> key release code (B6h) did not precede the <A> key and the system knew that one shift key was depressed while the <A> key was pressed. Other scan code systems, such are used in the AcessBUS standard, do not require that the system track the state of the shift codes. Instead, the bus transmits the shift state codes with each character. The disadvantage of this technique is that the keyboard is tied to specific keys to use as shift keys. However the keyboard does not have to send key release (key up) codes. This allows the keyboard to support more than 127 keys with a single byte scan code. With the keyb down/key up scan codes, it takes two unique codes per key to accomplish the same range of character coverage, limiting the number of keys.

Scan code techniques reduce hardware cost. For example, except for the key caps, there is no difference between a French and a German keyboard. In fact even the "capslock" light is under software control allowing the systems to adjust the use of the capslock key. In the case of the French AZERTY keyboard the capslock works as a shift lock key. This is because, in lower case, all four rows are lower case letters, plus some symbols. One must shift to upper case to get numbers. The keyboard takes advantage of the fact that some letters, such as the "c", only appear in lower case in French. However, the capslock key on these keyboards is not a toggle key, as it is in most other keyboards, where pressing it once engages capslock and pressing again disables it. Instead pressing it once or more than one with shift to upper case. It will remain in upper case until a shift key is pressed and released. This resembles older typewriters which used a mechanical shiftlock technique.

The operating system (OS) on typical computers, either through keyboard IDs sent by the keyboard at initialization time or through operating systems configuration files (or both), selects tables to use to translate the scan codes to characters. The tables used vary depending on the language and code page. A code page is a logical construct that assigns unique binary values to each character. For example on a US PC using code page 437 (US) the Japanese Yen symbol is 9Dh. In the Japanese code page 932 this value is used as the first byte of a two byte Kanji symbol. Therefore the 932 code page uses 5Ch for the Yen symbol replacing the back slash " " symbol. Thus if a user is typing on a system with a Japanese keyboard and the current code page is 932 then the computer will generate a 5Ch code for the Yen keyboard character, but if the user switches to the US 437 code page it will generate a 9Dh code for the Yen character.

At times the computers keep track of code pages, but in other cases, such as special symbols, the system just changes fonts to remap the characters to symbols that have no relation to the actual character as stored.

In some cases the language has too many characters to assign a unique key per character. In languages like Japanese, Chinese and Korean the operating system contains an additional process to convert the raw input characters to the actual characters. This process is an input method editor. In Japanese, for example, the user inputs in Roman or Kana characters, with Kana characters representing syllabic sounds. The input method editor is used to select the appropriate Kanji (ideograph) characters based in the keyboard characters. Typically the keyboard contains special keys to control the input method editor. In the case of Chinese, often the input method editor selects hanzi based on pieces of the character shape (radicals). In the case of Korean, hangul is entered by entering the jama that compose the character.

Other languages use multiple keystrokes to enter characters. Often these are non-spacing (dead keys). These are often use for diacritics (accent marks). The typewriter technology implemented the diacritics by typing the symbol but not advancing to the next space, thus using a dead key or non-spacing character. The computer will either combine the two keystrokes as a single accented character, or will store the character and diacritic as two separate character. When they are stored they are often stored in the reverse order that they are typed to simplify sorting. Thus typing <umlaut> +"U" with create either a U-umlaut character or a "U" character followed by an umlaut character.

To avoid changing code pages, new standards such as UNICODE and ISO 10646 were developed. UNICODE currently has about half of its potential 64 thousand characters assigned and supports not only the characters sets of most modern languages but also special characters that did not fit into any code page. With standards like this the problems of character storage are greatly simplified. New printing and font technology enables us to display and print large character sets. However, currently there is no technology to input such a large character set.

None of the prior art methods or approaches successfully addresses the problems of making a single, economical, keyboard structure applicable to a multiplicity of different languages and alphanumeric systems. A need for a more universal keyboard structure, adaptable for use around the world, remains.

DISCLOSURE OF INVENTION

Accordingly, it is an object of the present invention to provide a multi-character set keyboard system that requires only one keyboard to function with a multiplicity of languages and alphanumeric schemes.

It is another object of the invention to provide a multi-character set keyboard system that switches quickly and easily between alternate sets of characters.

It is a further object of the invention to provide a multi-character set keyboard system which provides easily readable alternate character sets while retaining the key size and touch/feel characteristics of standard computer keyboards.

It is yet another object of the invention to provide a multi-character set keyboard system which is interchangeable with standard computer keyboards.

It is still further object of the invention to provide a multi-character keyboard system with overlaying templates that can be installed and removed from a "live" system without inadvertently operating the keys of the keyboard.

It is yet another object of the present invention to provide a keyboard system which retains substantially the same touch and feel to the user as conventional keyboards while having substantially increased applicability.

It is still another advantage of the present invention to provide a keyboard system which is plug compatible with existing keyboards so that no hardware modification will need to be made to a computer system prior to use.

The present invention is a multilingual keyboard system which is adapted for use with data processing units, such as computers, wherein the input is provided from an alphanumeric keyboard. The multilingual keyboard system is adapted to be utilized with single user systems wherein the user wishes to utilize a variety of languages and character sets and also for multiuser systems where the different users are comfortable with different keyboard layouts or character sets. The system is adapted to be compatible and interchangeable with existing keyboards without any hardware modification to the remainder of the system. The overall multilingual keyboard system will include software modifications, either directly within the keyboard in some systems, or by way of software inserted into the programming of the central processing unit in others, which allows the system to operate on a variety of languages and alphanumeric character schemes.

Briefly, a preferred embodiment of the present invention is a multilingual keyboard system including a custom keyboard unit which is adapted to be a plug compatible replacement for the existing keyboards utilized with central processing units, such as personal computers and the like. The keyboard system of the preferred embodiment includes a logic system which may be embedded software or firmware in the keyboard electronics themselves, and/or may also include custom software for introduction into the external computer system. For current PC systems, the custom software for the PC will be the most feasible embodiment. A series of keyboard overlay templates are provided for interfacing with the custom designed keys of the keyboard unit in such a manner as to provide a readily discernible alternate character set in conjunction with the existing keys. A special alternate mode key switch is provided on the keyboard to allow the invocation of the special character set which is depicted on the overlay template. In a preferred embodiment, the template itself will have a coded projection which is adapted to mate with a projection reader on the keyboard unit so that the keyboard logic system is aware of the particular overlay template being utilized. Alternatively, an input key combination is provided to identify the particular template being utilized.

An advantage of the present invention is that it facilitates rapid and simple interchanging between multiple alphanumeric character schemes.

Another advantage of the present invention is that an unlimited number of different templates may be utilized with the same keyboard.

A further advantage of the invention is that the keyboard retains plug compatibility at substantially the same look and feel as preexisting keyboards with which the user will be familiar.

Still another advantage of the invention is that a touch typist familiar with an alternate key layout (such as AZERTY) may efficiently use a keyboard having a different default layout.

A further advantage of the present invention is that it is not limited to actual languages but may also be utilized to provide support for character sets including such items as drawing symbols, mathematical symbols, dingbats and the like.

Yet another advantage of the present invention is that any of a variety of overlay templates may be selected and installed without undue difficulty.

A still further advantage of the present invention is that the keyboard may be utilized in a normal manner without interference from the template or the special logic system, if such is desired, and may be readily converted to and from the mode for use with the template, whenever desired.

Another advantage of the invention is that it may result in substantial overall cost savings, particularly in areas (such as India) where support of multiple character sets is a requirement. Even though a single custom keyboard may be more expensive than a standard keyboard, the system device is much less expensive than multiple single use keyboards.

Still another advantage of the present invention is that it is an open ended system, that is, by modifying the logic system and external programming, an unlimited variety of templates and character sets may be utilized with the same keyboard unit.

These and other objects and advantages of the present invention will become clear to those skilled in the art upon review of the following description of the best mode, the accompanying drawings and the appended claims.

BEST MODE FOR CARRYING OUT THE INVENTION

The best presently known mode for carrying out the present invention is a multilingual keyboard system adapted for utilization in an electronic system accepting keyboard input. In particular, the multilingual keyboard system is adapted for use with personal computers and other computer systems and is particularly aimed at users who wish to utilize alternate keyboard layouts and/or a multiplicity of alphanumeric character schemes. The present system is adapted to utilize a single keyboard structure to operate under a variety of conditions.

Figure 1:
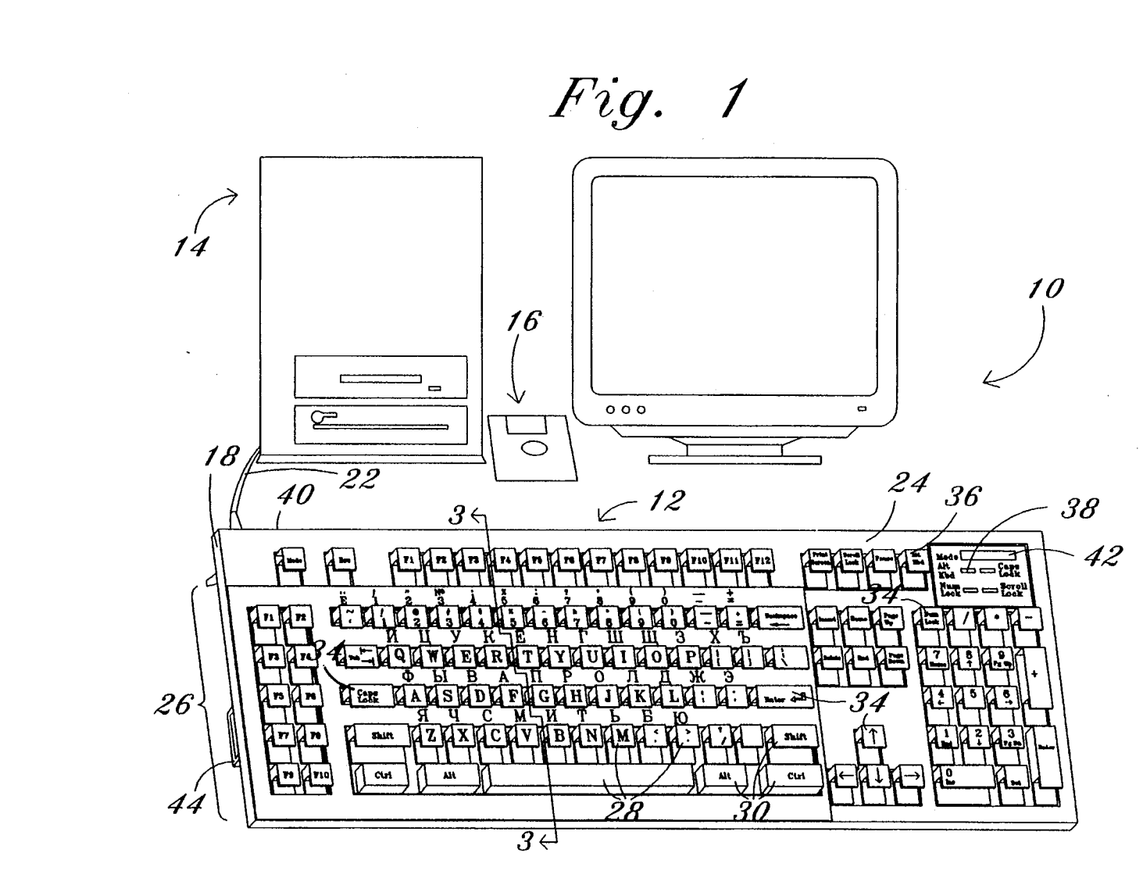
FIG. 1 is a perspective view of a multilingual keyboard system according to the present invention, shown installed upon a conventional personal computer.

The preferred embodiment of the present invention is a multilingual keyboard system which is illustrated in a somewhat fanciful perspective view in FIG. 1, and is designated by the general reference character 10. The multilingual keyboard system 10 includes a keyboard unit 12 which is adapted to be connected to a conventional central processing unit 14, typically a personal computer or network or system terminal. The keyboard system 10 utilizes a logic system/software 16 in order to provide appropriate signals to be delivered from the keyboard unit 12 to the character processing logic within the central processing unit 14. The nature of the logic system/software 16 will vary somewhat depending upon the nature of the keyboard unit 12 and the central processing unit 14, but will be in the form of firmware and programming.

The keyboard unit 12 is adapted to be utilized with any of a variety of specifically designed keyboard overlay templates 18 which fit on the face of the keyboard 12 and in conjunction with the specially constructed key members 20.

As may be seen in the illustration of FIG. 1, the keyboard unit 12 according to the present invention 10 is substantially similar to existing conventional keyboard structures. It is designed to be compatible both in the manner in which it interfaces with the central processing unit, typically through a cord 22, as illustrated, and in the substantial look and feel of the unit 12. To this end, the keyboard unit 12 includes a conventionally designed support frame 24 having a key layout portion 26 formed on the upper surface thereof.

A variety of different types of key members 20 are present within the key layout section 26. These may be separately considered by function, relative to the manner in which the central processing unit 14 eventually interprets the act of depressing and/or releasing the particular key member 20. For the ease of discussion, the types of key members 20 may be considered to include alphanumeric keys 28, modifier keys 30, toggle keys 32 and special function keys 34. The alphanumeric keys 28 are those keys which are intended to send a specific character or symbol to the operating software when depressed under normal conditions. The alphanumeric keys will include the ordinary alphabetical keys, the punctuation symbols, the space bar and the numeric symbols which are typically found on an ordinary keyboard layout. The modifier keys 30 are those keys which are intended to be depressed simultaneously with one of the other keys to modify the result obtained therefrom. Typical of this type of key are the "Shift" and "Ctrl" keys which are typically found on a standard computer keyboard. The toggle keys 32 are those keys which are depressed once and then will hold a particular configuration until manually released, and/or depressed and released again. Typical examples of the toggle keys 32 are the "Caps Lock" and "Num Lock" keys. The special function keys 34 not only include the programmable functional keys which are typically found on a computer keyboard (usually designated "F1, F2, F3 . . ."), but also those keys which cause the operation of particular functions within the programs being run on the CPU 14. These will include such keys as the cursor control keys, the "Tab", "Page Up", "Page Down", "Esc" and "Enter" keys.

Although the present invention is adapted to utilize any one or combination of the key members 20 in its usual and alternate modes, the modifications required by most other languages and alphanumeric character schemes will primarily relate to the alphanumeric keys 28. Hardware and Read Only Memory (ROM) requirements of many computer systems may make it difficult to effectively modify the output of some of the additional types of keys, so the simplest form of the invention will modify the layout with respect to the alphanumeric keys 28, in particular. Nonetheless, all of the key members 20 of the multilingual keyboard system 10 of the preferred embodiment will be adapted to operate in alternate mode.

Since the keyboard unit 12 is adapted to operate both in the conventional mode and in a variety of alternate modes, it is necessary to provide additional hardware which allows the user to select the mode of use to which the keyboard unit 12 is to be adapted. To this end, the keyboard unit 12 includes at least one additional key, this being a keyboard mode key 36, as illustrated in FIG. 1. The preferred keyboard mode key 36 is adapted to be a type of toggle key 32 which is toggled from one position to another in order to invoke either the conventional mode, in which the characters imprinted on the keys themselves are utilized or an alternate mode in which the template character set is utilized. In the preferred embodiment 10 the condition of the keyboard mode key 36 will be indicated to the user by a mode indicator light 38 which is found on the keyboard in conjunction with conventional indicators, such as those utilized to display the condition of the other toggle keys 32, such as "Num Lock" and "Caps Lock".

Although the conventional mode of use will remain specific to each keyboard, for most applications, an unlimited variety of alternate keyboard modes may be invoked utilizing the system 10. For this reason, there must be some means by which the user can convey to the logic system 16 the particular variety of alternate mode being utilized. A variety of means of inputting this information may be utilized, but two specific modes contemplated by the inventor are shown and described herein.

The first method of selecting a particular alternate mode to utilize includes adding a further additional key member 20 to the keyboard layout 26. This will be a mode selector key 40 which is a type of special function key 34 which allows direct input from the keyboard into the logic system 16. In usage, when the mode selector key 40 is depressed, additional keys may be utilized to enter a specific code into the logic which will correspond to the particular keyboard overlay template 18 being utilized. In this event, the logic system 16 will be programmed to accept a variety of specific input codes, with each corresponding to a particular template and character set. When a preferred mode selector key 40 is utilized, it is desirable to further include a mode display panel 42 to display either or both the code corresponding to the particular template 8 and/or a title designation for such template.

Figure 6:
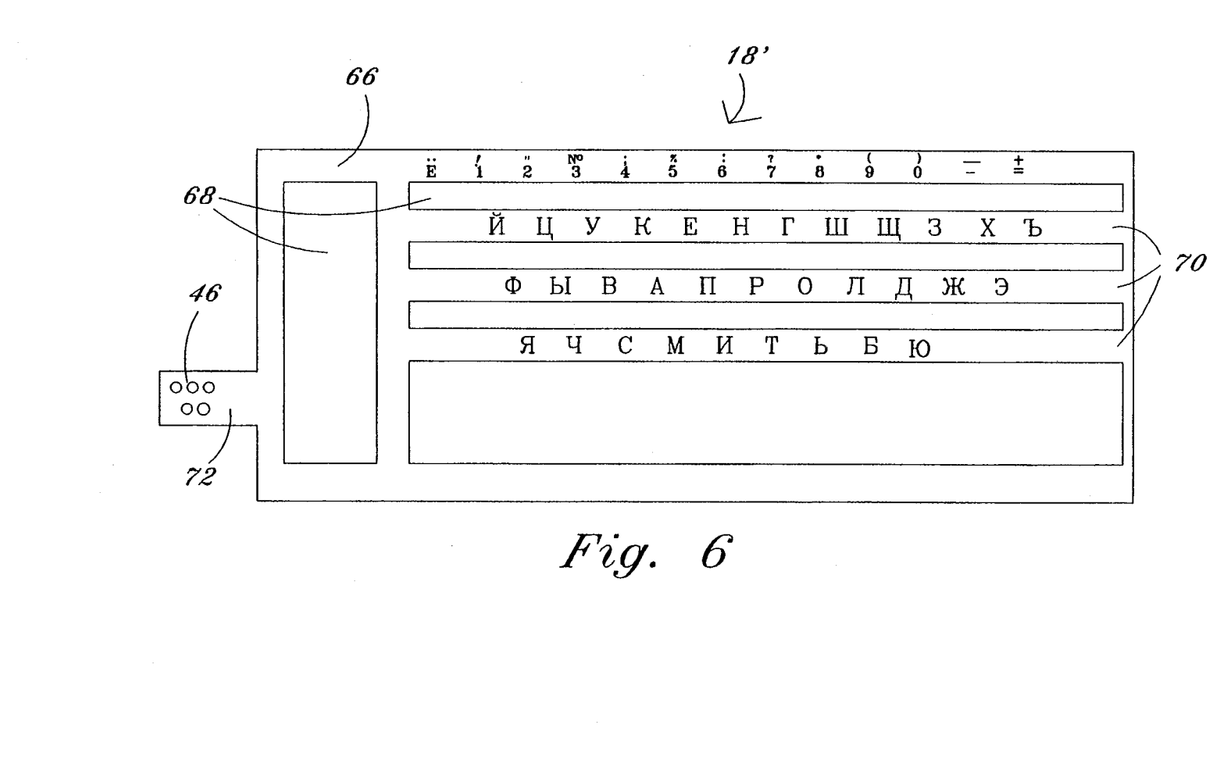
FIG. 6 is a plan view of an alternate keyboard overlay template.

A second, and, in many ways, preferred, method of conveying the selection of alternate keyboard mode to the logic system 16 is to utilize a template tab port 44 provided in the support frame 24 of the keyboard unit 12. The template tab port 44 is adapted to be utilized with a template tab 46 found on an alternate keyboard overlay template 18', as illustrated in FIG. 6. The mode tab 46 is provided with a variety of coding, either magnetic, optical or physical, which may be sensed by mode sensors 48 associated with the template tab port 44. The coding will be unique to the template 18' which is being utilized.

The use of the alternate template 18' including a mode tab 46 will insure that the alternate keyboard mode will clearly correspond to the template 18' which is installed. In this utilization, it may or may not be desirable to utilize the mode display panel 42 to indicate the alternate character set in use.

Figure 4:
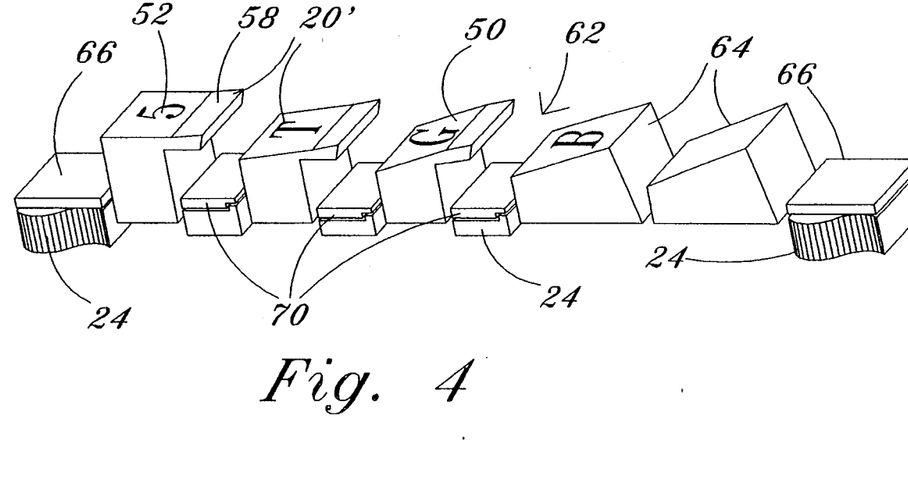
FIG. 4 is a cross-sectional view, similar to the view of FIG. 3, showing an alternate embodiment of the keyboard of the present invention.
Figure 5:
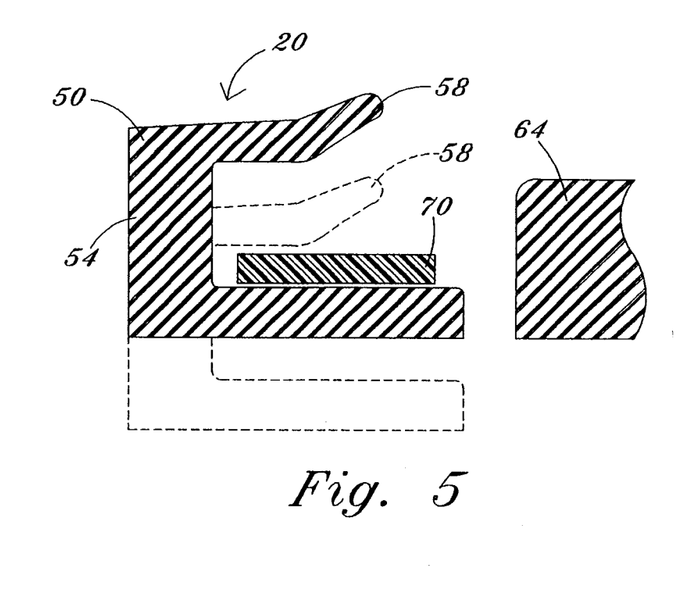
FIG. 5 is a detailed cross-sectional view of one of the keys and an associated portion of the template.

The manner in which the keyboard overlay template 18 interacts with the keyboard unit 12 is illustrated in FIGS. 1 and 5, particularly. The interface is facilitated by the specific construction of the key members 20 of the present invention. The structure of the key members 20 is illustrated particularly in FIGS. 2 through 5 and the structure of the template 18 is best illustrated in FIG. 6.

Figure 2:
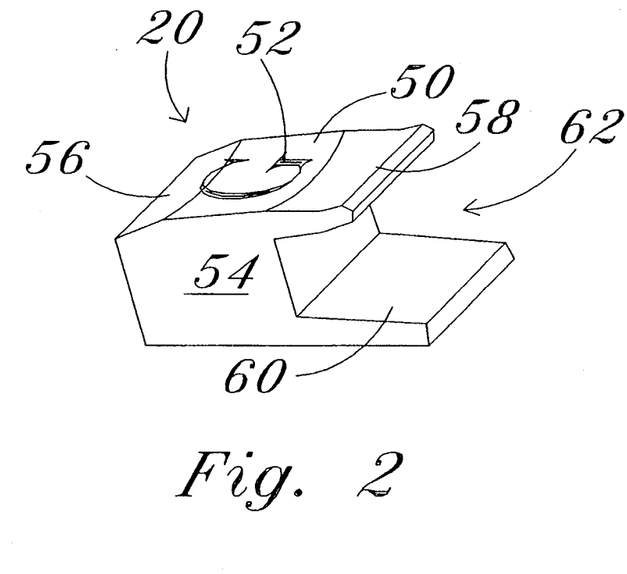
FIG. 2 is a perspective view of one of the key members utilized on the preferred keyboard.

As is shown particularly in FIG. 2, each key member 20 includes a keytop 50, where a key label 52 will ordinarily be present, a post portion 54, a rear slope portion 56, and a front overhang 58 and a front base ledge 60 which extend outward from the post portion 54 to define a template detent 62.

Each keytop 50 is formed to be concave along the front to back axis of the key much like a standard keyboard key so that it will feel the same to a typist. However, the edges on the left hand and right top of the key as it approaches the rear of the key will be flatter to make it easier to slide the template 18 into the space under the key behind it. This will not alter the feel of the key since the fingers make little contact with the right and left corners of the keytop 50 due to the rounded end of the tip of the fingers. The front edge will be raised slightly in the middle to make it easier for the template to slide under the front lip of the key 20. This should also not affect the feel significantly since the finger pad is slightly spherical. In fact, this construction it will make the locator bumps that are often put on the "F" and "J" keys easier to feel if they are situated on the front edge.

Figure 3:
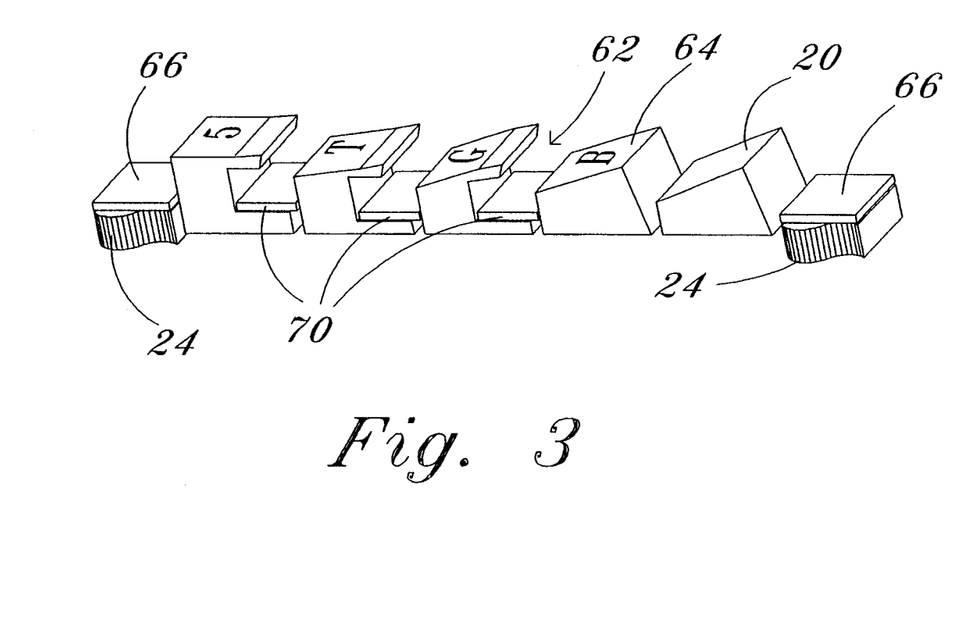
FIG. 3 is a cut-away cross-sectional view of the keyboard, taken along line 3—3 of FIG. 1.

In FIG. 1, it is illustrated that all of the key members 20, with the exception of the extreme bottom row keys such as "Ctrl", "Alt" and the space bar, are constructed to include the template detent 62, although it may not be that each key will actually receive a template. That is, as is shown in FIG. 1, the bottom row keys 20, including the key labels 52 for Z, X, C and the like do not actually receive a portion of the template. Therefore, as shown in FIGS. 3 and 4, each of the keys in this row need not be provided with a template detent 62 and can be in the form of a conventional key 64, as is illustrated for the key carrying the key label for "B".

An alternate structure for the key members 20 is illustrated in FIG. 4, with the alternate key members 20′ being designated as 20′ differing from the preferred key members 20 in that the front base ledge 60 is eliminated. Instead, portions of the keyboard support frame 24 will extend intermediate the keys 20′ to provide greater structural stability to the key layout portion 26 of the keyboard unit 12. In the case of the alternate key member 20′, the template detent 62 is formed intermediate the bottom of the front overhang 58 and the top of the keyboard frame 24. It is understood that the distance of travel in a vertical direction for each of the keys 20 and 20′ is very limited so that there is no impact between the front overhang 58 and the frame 24, in any event.

It is also noted that the keys of both types do not necessarily include the rear slope portion 56 and the inclination of the of the keytop 50 and the front overhang 58 will differ from key to key. This is a result of different ergonomic designs for the keys at various locations on the keyboard and is intended to provide maximum comfort and utility. Different shapes and spacings of the keys are well known in the art and a very wide variety of keyboards are available. Those shown in the drawing are for the purposes of illustration only and it is understood that, with the exception of the presence of a template detent the specific structure of the key members 20 and 20′ is not critical to the operation of the invention. The "feel" is very important, but since standard keys differ so dramatically there is no single structure which will emulate each type of "feel".

The manner in which the key members 20 and the template 18 interact is illustrated in FIG. 5, and the particular structure of a typical alternate template 18′ is illustrated in FIG. 6. As shown in FIG. 6, the keyboard overlay template 18′ is essentially a single planar structure which has been cut to fit the particular shape of the key layout 26. The template 8 (or 18′) will be constructed of a pliable semi-rigid material, such as plastic, for facilitating installation and removal. To this end, the template 18′ includes a back plate portion 66 having several key windows 68 removed therefrom. The key windows 68 are adapted to receive the keys 20 of the various types and will be positioned and sized according to the specific structure of the key layout 26 of the keyboard unit 12 which is selected for use. For the type of overlay template 18 illustrated in FIG. 1 (and the similar alternate template 18′ illustrated in FIG. 6), a total of five key windows 68 are provided, with one being adapted to receive the function keys located along the left side of the keyboard 12 and the rest being adapted to receive the typical keys of the key layout 26 illustrated in FIG. 1.

Each of the key windows 68 which is associated with key members 20 which are to be utilized with an alternate character set is also associated with a label panel 70 adjacent thereto. In the illustrations of FIG. 1 and FIG. 6, the label panels 70 are situated directly above the particular keys 20 which are intended to be modified. The label panels 70 are provided with key labels 52 corresponding to the unshifted and shifted characters to be produced upon use of the key involved, in accordance with the alternate mode. The illustration of FIG. 6 shows a few of the associated key labels 52 on the label panel 70, while the illustration of FIG. 1 provides a more complete illustration of a typical template 8, in this case one adapted for use with a Cyrillic alphabet.

The particular alternate template 18′ illustrated in FIG. 6 is shown to include a mode tab 46 adapted to interface with the template tab port 44 shown in FIG. 1. In this illustration, the mode tab 46 is provided with a flexible tab stem 72 which allows the mode tab 46 to be positioned for insertion into the template tab port 44. Also, as shown in this illustration, the mode tab 44 is provided with apertures to allow optical or physical reading of the code corresponding to the alternate keyboard mode being selected. As discussed, a wide variety of methods may be utilized to deliver this code to the logic system with redundant delivery systems being desirable in many instances. The mode tab method has a particular advantage in that, once inserted, no further identifying input is required from the user upon rebooting the system, or the like.

In addition to the key labels 52 appearing on the label panel 70, there may be additional information printed on the keyboard overlay template 18. This might include such items as the title of the particular template and the code corresponding to the mode. This sort of information may be placed on the back plate 66 in whatever location is desired.

As is shown in FIGS. 3, 4 and 5, it may be seen that the label panels 70 which are situated intermediate the longitudinal key windows 68 will fit within the template detent 62 of an associated one of the key members 20. The spacing and shaping of the key members 20 is such that the template 18 may be easily installed by aligning the key windows 68 above and slightly in front of the associated key member 20 and pushing forward and down to insert all of the label panel 70 into the template detent 62, with the back plate 66 laying flush against the frame member 24. An alternate, easy-insertion, design of the labels panels 70 has these panels "hinged" so as to be easily aligned to be inclined from the plane of the back plate 66. This may be accomplished by actual hinging on the lateral edges of the label panels 70 or by providing deformation slots in the same location to facilitate independent inclination of each panel 70. This makes it easier to install and remove the template 18.

In some areas and applications, the use of physically split keyboards is popular. Additionally, dual keyboards are used in some situations. For these purposes it may be feasible to utilize keyboards 2 and templates 18 which are physically configured to meet the needs of these circumstances. In particular, a dual-keyboard, dual-template system would provide extreme flexibility and language combining facility.

FIG. 5 also illustrates the extent of travel of the key member 20 when it is depressed and activated. The position of the front overhang 58 is illustrated in a solid fashion in the undepressed condition and in phantom in the depressed condition. It may be seen from this illustration that, even when the key 50 is depressed, there is no impact with the label panel 70, so the template 18 will not become damaged during usage.

The manner in which key strokes delivered to a keyboard are converted to analog or digital electronic signals which are interpreted by the central processing unit 14 is well known in the art and is subject to being accomplished in a variety of manners (as is discussed above, herein). The specifics of causing the CPU 14 to receive an appropriate signal are not precisely a part of the present invention, although the means of accomplishing this are a necessary element in order to cause the system to operate properly. Accordingly, for the purposes of illustration, typical manners of modifying the key stroke signal are described herein in general terms.

In a keyboard such as the keyboard unit 12 the depression of a key member 20 will result in a signal being delivered to a keyboard microprocessor 74 within the keyboard itself. The keyboard microprocessor 74 is typically a limited duty integrated circuit structure which is adapted to interpret the location of the key 20 which is being activated and to send an appropriate key code signal 76 through the cord 22 to the CPU 14.

The key code signal 76 (scan code) will be unique to each character or operation which corresponds to a particular key. Further, the key code signal 76 will be different depending upon whether one of the modifier keys 30 is depressed simultaneously with the key member 20 involved. The nature of the key code signal 76 will vary depending on whether it is converted to a digital value at the location of the keyboard microprocessor 74 or within the CPU 14 itself. However, a digital signal corresponding to a particular character or activity is the most common result of the depression of one of the keys 20.

Various conventions have been established for assignment and interpretation of digital signals. One of the most common and best understood is that referred to as the ASCII character set in which two hundred fifty six (256) specific digital key code signals 76 are utilized to correspond to specific characters, symbols and operations. Other character schemes are utilized in different cultures and languages. Further, with the availability of broader band computing capacity, the limitation of two hundred fifty six (256) codes within a particular table is no longer relevant to most computer systems, so that much larger character tables may be generated and utilized. To this end, there have been attempts at creating a universal character set in which effectively unlimited digital signals may correspond to a variety of different characters and symbols. One such is designated as UNICODE. This is particularly important when dealing with languages having substantial numbers of symbols such as Chinese and Japanese.

The purpose of the logic system 16 associated with the invented keyboard system 10 is to cause the CPU 14 to receive the intended one of a large variety of potential key code signals 76. That is, the object is to make the system 10 effectively transparent to the user so that the user may look at the standard QWERTY key layout 26, such is illustrated in FIG. 1, look past the standard key label appearing on the keys 20 to the alternate key label appearing on the label panel 70, and, if the alternate key board is selected, press the "Q" key and be certain that the CPU 14 will interpret the results as corresponding to the "backwards N" symbol utilized in the Cyrillic alphabet. Since the remapping of the keyboard which is caused by the association of the template 18 and the selection of the alternate mode is intended to correspond with the keyboard layout that a typical user of the selected character set will know, this will accommodate effective touch typing in the alternate language. That is, the remapping of thee keys is intended to correspond as closely as possible to the keyboards which are originally utilized by those who type in the language or character set selected.

It is understood that the complexity of the remapping software which is part of the logic system 16 will vary substantially depending upon the alternate character set selected. Therefore, unique remapping logic will be required for each of the alternate keyboard modes for which the keyboard system 10 is utilized. For example, the most common keyboard layout found in France utilizes a "AZERTY" layout, as opposed to the "QWERTY" arrangement found in the United States. A template for conversion into the AZERTY scheme would have relatively straightforward and simple associated remapping logic, since only a few additional characters would need to be added and certain of the keys would need to be switched as to their signals. On the other hand, a conversion into a language which has hundreds of potential characters would require much more extensive remapping logic.

The mapping logic, also known as the translating system, is contemplated to exist primarily in one of two potential versions. The first of these is a software translation mode which is fancifully illustrated by the floppy disk labeled as sixteen (16) in FIG. 1. In this mode, the keyboard microprocessor 74 sends a signal to the CPU 14 according to the registering apparatus. Additionally, the keyboard microprocessor will have signals corresponding to each of the modifier keys 30 and the toggle keys 32 affect the interpretation of the signal from a character key 28. Typically, the modifier keys 30 and the toggle keys 32 will address a particular byte in the CPU processing system or create a flag in the interpreting program or subroutine. The scan codes corresponding to the alphanumeric keys 28 can then be translated by the software into the corresponding character.

For example, the logic system/software 16 may include loading a plurality of alternate scan code lookup tables into the memory of the CPU 14. The logic software 16 will also include logic for selection of the particular lookup table depending upon the condition of the keyboard mode key 36 and also upon the selected one of the alternate mode, as would be selected using the mode selector key 40 or the template tab port 44. The keyboard subroutine which would loaded with the logic system 16 would then interpret all of the inputs to select a specific key code signal 76 which is to be utilized and also to select which of the various lookup tables was appropriate. The output of the lookup table would then be in the form of a standard scan code which may be utilized by whatever software is running on the CPU 14.

The second (prospective) method is intended for use where an advanced keyboard logic adapted for 16 bit signals is present or where some other method of incorporating the UNICODE structure or a similar large scale mutli-character set system is available. In this case, the keyboard microprocessor 74 may directly generate a unique UNICODE scan code (more complex than is common with present technology) without the necessity of involving the software of the CPU 14 itself for translation purposes. In such a structure, the keyboard microprocessor 74 would be sufficiently sophisticated to generate a unique code for each combination of keys, including combinations incorporating the alternate mode key 36 as a toggle. Further, the keyboard microprocessor 74 would be sufficiently sophisticated to utilize remapping corresponding to the particular template 8. It is understood that this alternative will not be available with the bulk of existing systems.

Particular problems may be necessary in circumstances, such as Japanese, where character keys may be utilized in more than one form (HIRAGANA and KATAKANA, for example). In typical attempts to adapt western style keyboard to Japanese language, a function key is assigned to switch between the character form. In such a case, the keyboard microprocessor 74 will then have specific instructions to remap based upon the condition of the specified function key.

To this end, it is envisioned that at least two types of keyboard microprocessor 74 would be utilized in conjunction with the multilingual keyboard system 10. The first of these, as described above, would be adapted to communicate effectively with a standard CPU 14 running software which would require the conventional two hundred fifty six (256) character type of lookup table. For this sort of application, the keyboard microprocessor 74 would be selected to be substantially identical to the conventional microprocessors present in current keyboards, and the modifications necessary to interpret the keystrokes would be made in the software 16 which would be loaded into the CPU 14.

In the futuristic case, where the computer system 14 and the associated operating software are adapted to operate in UNICODE, or a similarly inclusive character system, the keyboard microprocessor 74 would include the built-in capability to directly generate the specific UNICODE scan code corresponding to the character. In such an event, no modification would need to be made to the software running in the CPU 14. Since all of the characters would already be included in the single UNICODE lookup table scheme, no keyboard system specific software would be necessary for programming the particular computer system. For a sophisticated system, this is desirable since the only alteration necessary would be swapping the keyboards, and operator error would be minimized.

A further modification which is contemplated is the elimination of the physical template and replacement with a virtual template, by incorporating all of the template features into the keyboard itself. Although this will require a highly sophisticated keyboard microprocessor 74, it is feasible to incorporate all of the features presently provided by the template 18 into the "super delux" version of the keyboard 12. This future embodiment, which is not presently feasible due to high component costs and the scarcily of unicode receptive CPU systems, with allow a single keyboard to be used in essentially unlimited circumstances.

One manner in which this may be accomplished is in an embodiment where each potential template configuration is stored in memory in the keyboard, as in the present UNICODE embodiment, the portions of the keyboard frame 24 which are presently overlapped by the label panels 70 will be replaced by flat panel displays (LCD, or the like). Selection of a particular alternate mode will then cause the display of the desired character set to appear on the flat panel displays in the same location as do the labels on the present label panels. This sort of structure will facilitate extremely rapid switching from language to language and will allow reprogramming to accommodate changes in styles, as well.

As is clear, the present invention is adapted to be utilized in a variety of circumstances and with a large number of modifications. The particular structure of the key members 20, themselves, may be selected from any of several designs. Further, an unlimited number of templates 18, having different character sets, may also be interchangeably utilized. In addition, the structure of the templates 18 may be modified to operate with different types of key layouts 26, as desired. Also, as shown above, the manner in which the translation may be accomplished may be modified to fit the needs of the user and the existing hardware.

Those skilled in the art will readily recognize that numerous other modifications and alterations of the specific structures and methods may be made without departing from the spirit and scope of the invention. Accordingly, the above disclosure is not to be considered as limiting and the appended claims are to be interpreted as encompassing the entire scope of the invention.

INDUSTRIAL APPLICABILITY

The multilingual keyboard system 10 of the present invention is adapted to be utilized by a wide variety of potential users situated around the world and communicating in a multiplicity of languages and character schemes. The keyboard system 10 is adapted to utilize a keyboard unit 12 which will be comfortable and familiar to the majority of users. Also, for those types of keyboard layouts which are sufficiently popular in various parts of the world to be produced in mass quantities, similar types of corresponding templates 18 and logic software 16 may be constructed and produced, although the preferred embodiment 10 which is presently envisioned is adapted for layouts corresponding to the standard QWERTY structure utilized in the United States. The simple expedient of changing key caps means that alternate key layouts, such as AZERTY, may be sold in different areas.

The use which will be made of the multilingual keyboard system 10 will depends specifically on the needs of the user and the existing hardware. For example, if the user has an advanced CPU 14 which is adapted to operate with sixteen bit character codes, such as UNICODE, the user will then utilize a keyboard unit 12 having a keyboard microprocessor 74 which will generate UNICODE signals. In this instance, all that will be necessary will be to plug the cord 22 into the CPU 14 in place of the existing keyboard. For an earlier generation computer, or a different configuration, the user will not only perform a keyboard replacement, but will install the remapping software into the CPU 14, as well. The user will then select a particular alternate character scheme desired and install the template 18 corresponding thereto onto the keyboard 18.

The installation of the template is best accomplished with the computer off or the keyboard disabled and involves positioning the template 18 above the key layout 16 and pushing it down and forward so as to insert the label panels into the associated template detents 62 until the back plate 66 lies flat on the frame 24. However, the templates 18 and keyboard 12 are designed to facilitate careful "on-the-fly" template exchange, as well.

The user will need to "register" the particular template 8 being used. Depending upon the desired nature of mode selection, the user will either plug the mode tab 46 into the template tab port 48 or enter the appropriate code corresponding to the mode utilizing the mode selection key 40. Whichever method is utilized need only be repeated when the template b8 is changed. In most cases, a signal to the CPU 14 to indicate the selected mode will be simplest.

The user will then type normally utilizing either the existing layout, in which the alternate mode key 36 is not depressed, or the alternate mode in which the alternate mode key 36 is toggled into an "on" position. It is entirely feasible to switch between systems on the fly, as is necessary for some documents. Further, it is entirely feasible to change templates and add additional alternate modes in a relatively simple manner.

Since the multilingual keyboard system be according to the present invention is adapted to be utilized in an extremely wide variety of circumstances and is capable of use with existing hardware, the uses and number of potential uses are essentially unlimited. The versatility and simplicity of the system make it adaptable for operating conditions around the world and in all languages. Accordingly, it is expected that the multilingual keyboard system be according to the present invention will have industrial applicability and commercial utility which are both widespread and long lasting.

I claim:

1. A keyboard and template combination adapted to be utilized as input to processing devices for receiving keyboard input in the form of signals corresponding to the condition of the individual keys thereon, comprising:

a keyboard member having a plurality of keys arrayed thereon in a keyboard layout, the keyboard and the keyboard layout conforming in size, arrangement and shape to conventional keyboards utilized for such purposes, the keys having a keytop corresponding in size, shape and contour to conventional keytops, at least some of the keytops including key labels displaying a primary character typically generated by the processing devices in response to depressing the associated key, at least certain ones of the keys being further provided with a template detent formed underneath a front portion of the keytop, the template detent having a vertical extent greater than the range of vertical motion of the key during usage;

at least one template member adapted to mate with said keyboard member, said template member including a plurality of alternating key windows and label panels, the key windows being adapted to fit over selected ones of the keys and the label panels being adapted to rest within the template detents in such a manner that the label panels do not physically interfere with the travel of the keys during use, the label panels being provided with alternate key labels, each alternate key label corresponding to the desired alternate output of the one of the keys with which the alternate key label is associated and in the template detent of which key the label panel rests; and switching means for causing the processing devices to interpret keystrokes from said keyboard as either a default keyboard character set, corresponding to the key labels, or an alternate character set, corresponding to the alternate key labels, depending on the condition of said switching means.

2. The combination of claim 1, wherein the keytops of at least those keys situated visually intermediate the user and one of the alternate key labels is provided with a rear slope portion such that a visual path is provided to the alternate key label.

3. The combination of claim 1, wherein the portions of the keys other than the keytops are shaped so as to facilitate insertion and removal of said templates.

4. The combination of claim 1, wherein multiple interchangeable ones of said templates are provided, each said template having appearing thereon an array of the alternate key labels corresponding to selected associated character set, and template selection means are provided to cause the processing devices to interpret keystrokes of the keys to correspond to the selected one of said templates.

5. In a computer system adapted to receive character generation input from a keyboard, the improvement comprising:

providing a keyboard having an approximately conventional key layout thereon, including a plurality of individual keys, at least a majority of the keys having key labels thereon;

providing a template corresponding to an alternate character set from the character set of the key labels on the keys of said keyboard, said template including alternate key labels shown thereon; and providing logic means for interpreting activations of ones and combinations of ones of the keys, wherein the keys of said keyboard are [physically altered]substantially congruent in size and upper shape to those keys found on conventional keyboards, including a keytop having an upper surface contoured to comfortably receive the fingertip of a user, and selected ones of the keys including a front overhang extending over a template detent, the template detent being formed to receive a portion of said template therein such that said template may lie flat on the upper surface of said keyboard and such that said template does not interfere with the operation of the key, the template detent being formed so as to receive associated portions of said template thereunder such that the alternate key labels are apparent to the user in physical conjunction with the associated key, said logic means is provided with input to identify whether a standard keymapping scheme, associated with the key labels, or an alternate keymapping scheme, associated with said template, is to be utilized, and said logic means is provided with input to identify the particular alternate character set selected.

6. The improvement of claim 5 wherein
the selected ones of the keys further include a sloping rear portion to facilitate insertion and removal of the template and to facilitate visual accessibility of the alternate key labels.

7. The improvement of claim 5 wherein
each said template includes an identification coding, recognizable by said logic means, corresponding to a specific alternate keymapping scheme; and
the alternate key labels appearing on said template depict at least one character generated by the corresponding key when said alternate keymapping scheme is invoked.

8. The improvement of claim 7 wherein
the identification coding is embodied in a physical tab structure depending from said template; and
tab reading means for receiving the tab structure and sensing the identification coding thereon is associated with said logic means to facilitate selection of the specific corresponding alternate keymapping scheme.

9. The improvement of claim 5 wherein
said logic means includes custom programming for inputting into the computer system, the custom programming corresponding to the particular computer system;
a plurality of mutually unique keymapping schemes corresponding to the available ones of said templates; and
signal recognition means for receiving signals from said keyboard unit and generating desired output corresponding to the unique combination of activated keys in response to input determining the identification of the particular template in use and the activation status of the alternate keymapping scheme.

* * * * *